UNITED STATES PATENT OFFICE.

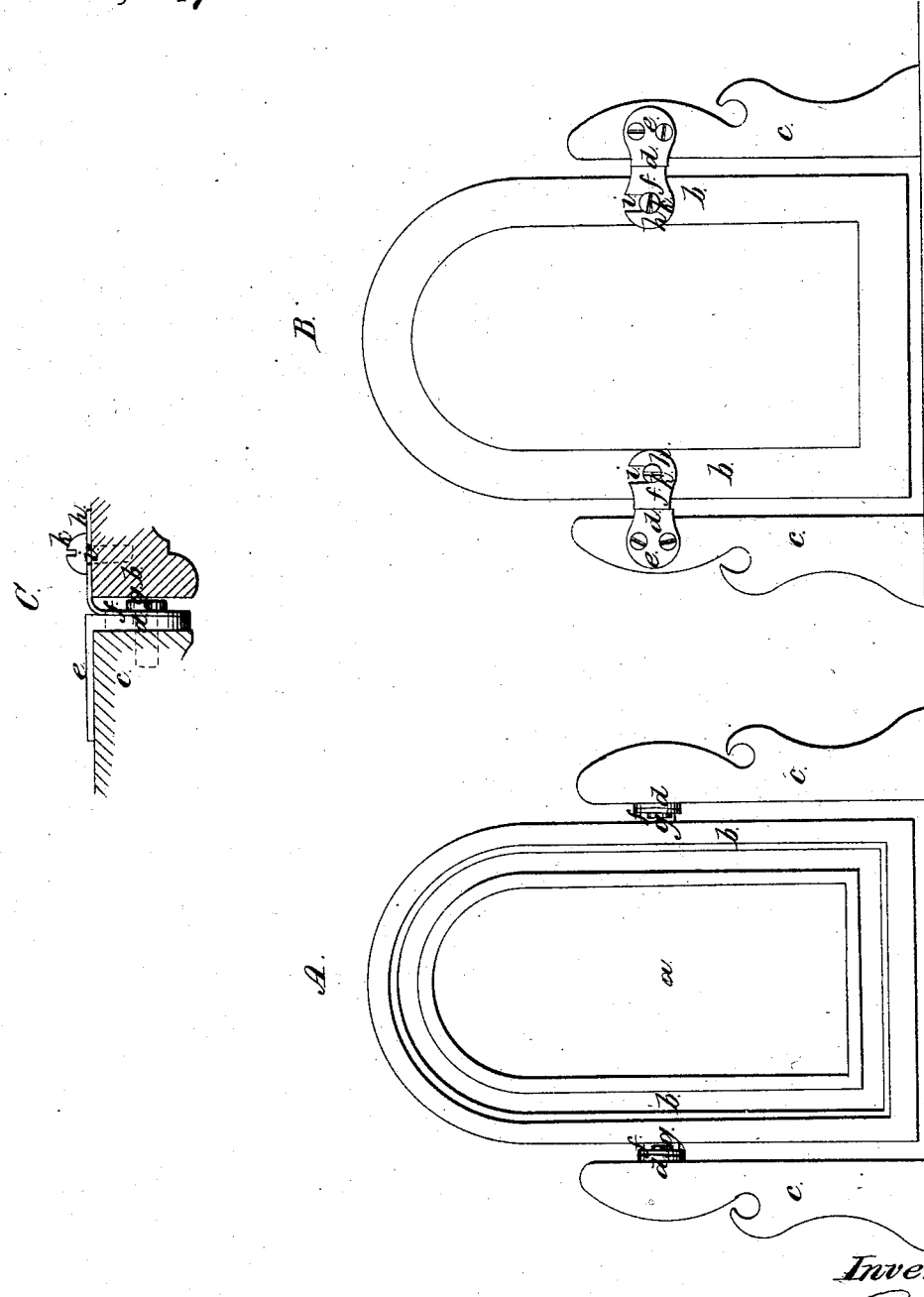

J. S. GRAY AND H. F. GRAY, OF CHELSEA, MASSACHUSETTS.

IMPROVED MEANS FOR HANGING MIRRORS.

Specification forming part of Letters Patent No. 55,647, dated June 19, 1866.

*To all whom it may concern:*

Be it known that we, J. S. GRAY and H. F. GRAY, of Chelsea, in the county of Suffolk and State of Massachusetts, have invented Improvements in Hanging Mirrors, &c.; and we do hereby declare that the following, taken in connection with the drawings which accompany and form part of this specification, is a description of our invention sufficient to enable those skilled in the art to practice it.

The invention relates particularly to the manner of hanging mirrors upon toilet-stands, bureaus, &c. As generally supported upon screws passing through uprights and into the mirror-frame, it is not easy to fix the glass at any desirable angle or inclination, as the weight of the mirror below the screws upon which it is hung tends to keep it in a perpendicular position.

The principal object of this device is to remedy this difficulty, and also to afford a ready means of detaching the mirror from the uprights and of applying it thereto.

The drawings represent a mirror hung in accordance with the invention, A showing a front, and B a rear, view of the same. C is a plan of the supporting device.

*a* denotes the mirror; *b*, the frame thereof; *c c*, the uprights between and upon which the mirror is to be hung. To the inner surface of each of these uprights we apply a bearing-plate, *d*, having a tail-piece, *e*, bent round and screwed upon the back of the upright. To each of these bearing-plates is secured a rocking plate, *f*, by a screw, *g*, passing through the two plates and into the uprights, each rocking plate turning freely on its screw. Each plate *f* has an extension or arm, *h*, in which is a slot, *i*, opening out of the top of the extension, as seen at B.

The rear side of the mirror-frame has, near its opposite edges, two screws or pins, *k*, placed in such position that they may enter the slots *i*, as seen at B, the heads holding the mirror firmly to the rocker-plates and the pins allowing the mirror to be easily removed from or applied to the uprights, as will be readily understood.

The adjacent surfaces of each two plates, *d f*, bear together and keep the mirror from lateral movement, and the bearing-face of each plate *d* is made inclined or twisting, the inclination in one plate *d* being the converse of that in the opposite one *d*, as seen at A. Each plate *f* is made with a surface fitting against the irregular surface of its plate *d*, or, if the rocker-plate is made thin, it may be sprung against and so as to fit into the irregularities of the plate *d* by the screws *g*, which enter the uprights and are fixed with respect thereto. If, now, these surfaces so fit when the mirror is perpendicular, it will be obvious that any change from such perpendicularity will tend to tighten the contact of the plates, and will thus hold the mirror at any desirable inclination.

A small mirror may, in this way, be suspended from one upright, the action of the friction-plates upon the opposite sides not being dependent one set upon the other.

It will be readily understood from this description that other objects than mirrors may be thus supported, though the invention is particularly applicable to them.

We claim—

The friction-plates *d f*, having irregular contact-surfaces, constructed and operating together as and for the purpose substantially as set forth.

J. S. GRAY.
H. F. GRAY.

Witnesses:
J. B. CROSBY,
F. GOULD.